July 31, 1945.   G. L. HASSLER   2,380,520
BOREHOLE INDICATING APPARATUS
Original Filed April 24, 1942   2 Sheets-Sheet 2

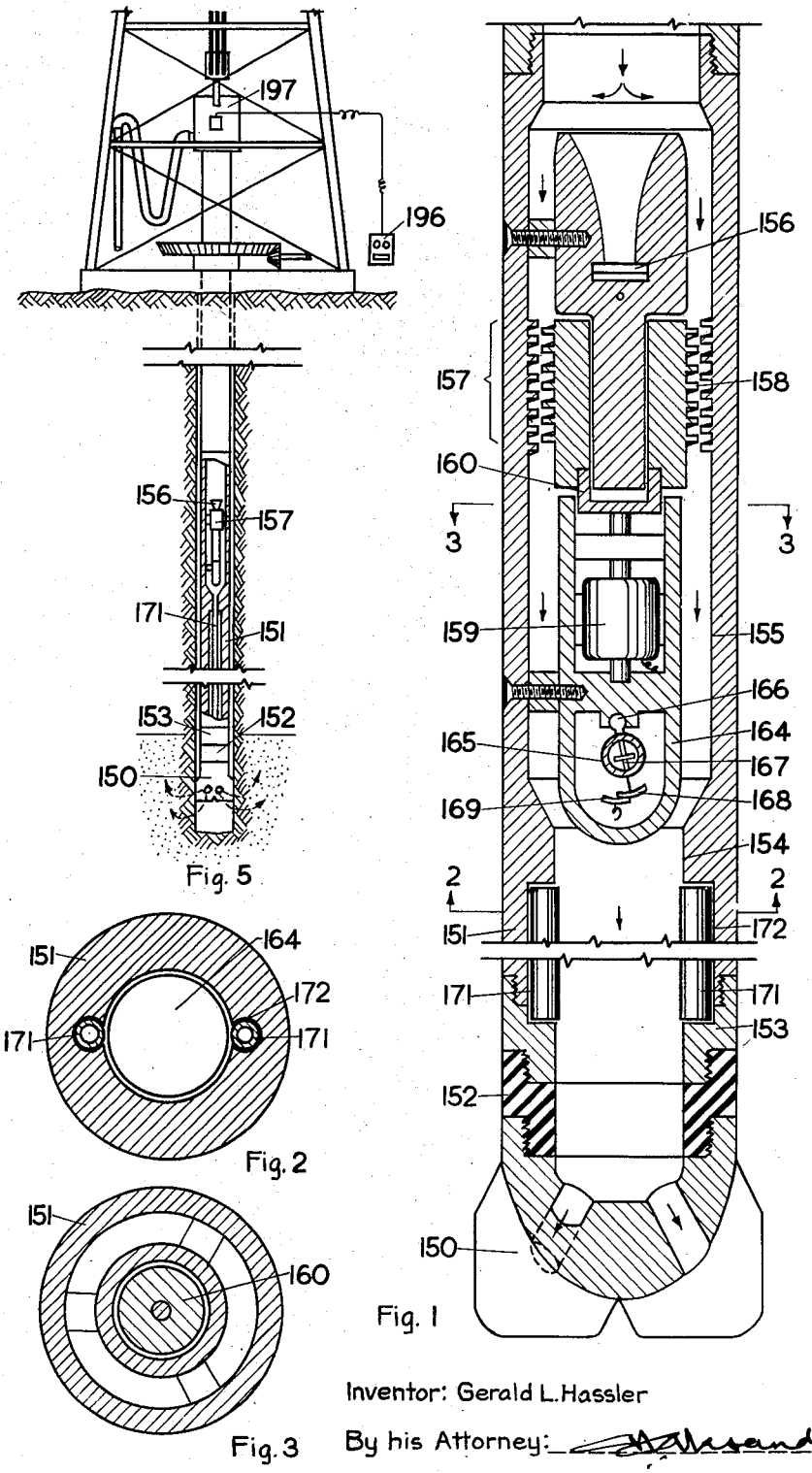

Inventor: Gerald L. Hassler
By his Attorney:

Patented July 31, 1945

2,380,520

UNITED STATES PATENT OFFICE 2,380,520

BOREHOLE INDICATING APPARATUS

Gerald L. Hassler, Altadena, Calif., assignor to Shell Development Company, San Francisco, Calif., a corporation of Delaware Original application April 24, 1942, Serial No. 440,405. Divided and this application March 25, 1944, Serial No. 528,117

2 Claims. (Cl. 73—151)

The present invention relates to an apparatus for transmitting signals to the surface from an instrument capable of detecting, observing or measuring the nature of the phenomena occurring in a borehole or the nature and characteristics of the formation traversed by said borehole, and pertains more particularly to apparatus for transmitting continuously a signal or a series of signals or vibrations through equipment or material in the borehole, such as the mud fluid, drill pipe or the like.

The present application is a division of my copending application Serial No. 440,405, filed April 24, 1942, now Patent No. 2,352,833.

Various instruments have been proposed for measuring various properties in a borehole, but these devices and methods are open to various objections. Since, when using self-contained recording instruments, there is considerable delay before the record is available to the driller, it has been proposed to use electrical conductors, sometimes together with synchronous motors, such as "Selsyn" motors and the like, to indicate immediately at the surface the measurements taken by the instrument. Due to the high cost of multi-wire insulated cables and their limitations with regard to their use in deep boreholes, such systems in many cases cannot be economically employed.

It is therefore an object of the present invention to provide a system for continuously indicating at the surface desired characteristics in a borehole without the necessity of using electrical cables or other directly-connecting means.

It is another object to provide a system comprising means to detect or measure a desired characteristic or feature in the borehole, means responsive to said measurements to transmit vibrations through the mud fluid or along the drill stem to the surface, and detecting and indicating means at the surface.

It is another object of this invention to provide an apparatus for transmitting to the surface decipherable signals responsive to the drilling variables such as of weight on the drill bit, rotational rate of the bit, bottom hole temperature and pressure, etc., whereby the driller may adjust said variables to their optimum values.

It is a further object to provide a method of and apparatus for simultaneously measuring the resistivity of the formation and the inclination of the borehole and obtaining at the surface indications proportional to said measurements without the use of an electrical cable or conductors extending down into the well.

Other objects will be readily apparent from the following description taken in reference to the drawings, which illustrate several applications of the present method and apparatus therefor. In the drawings, Fig. 1 is a longitudinal sectional view of an embodiment for simultaneously reporting the resistivity of the formation and the inclination of the borehole.

Fig. 2 is a cross-sectional view taken along the line 2—2 in Fig. 1.

Fig. 3 is a cross-sectional view taken along the line 3—3 in Fig. 1.

Fig. 5 is a schematic longitudinal view of the instrument in position in the borehole together with the surface equipment.

Figure 4:
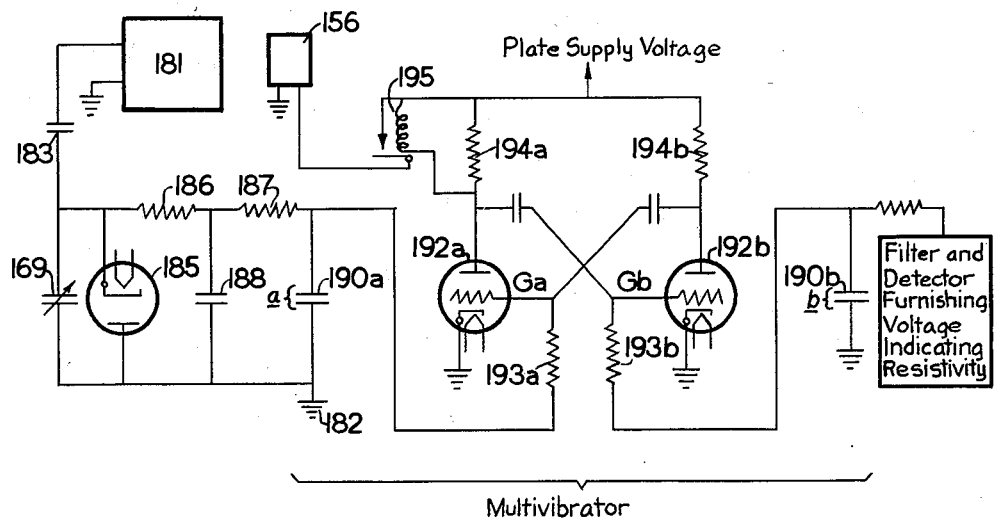
Fig. 4 is a diagram of a preferred electrical circuit for actuating the wave transmitter.

Generally, the present invention resides in the new apparatus for conducting continuously or for a predetermined period informative or control signals between the surface of a well and a device, such as a measuring or surveying instrument, in the borehole by means of vibrations, such as pressure or true sound waves, transmitted through usual material or equipment present in the borehole, such as through the fluid in the borehole, along the drill stem or pipe or any other suitable sound conducting channel, etc. The present apparatus for obtaining indications at the surface of desired measurements in the boreholes eliminates the use of expensive special signal conducting means, such as electrical cables, insulated drill strings and the like, which take considerable time to properly position in the borehole. Likewise, by means of the present invention, the measurements are instantly available to the driller or operater at the well head so that he may more accurately and efficiently control the drilling variables, such as the weight or load on the bit, rotational rate of the drill bit, bottom hole temperature and pressures, etc., and the positioning of various tools such as packers, liners, etc., as well as other operations, which depend on the nature of the borehole.

Suitable vibrations include sound waves or non-audible waves of lower or higher frequency which may be transmitted by equipment in the borehole, such as drill pipe, casing or fluid in the borehole. Various means may be used to initiate the desired control or informative vibrations. For example, various horns, clickers, and other similar devices may be used to produce the desired sound waves.

Various instruments and devices can be used with the principle of communication of the present invention. Thus, for example, a temperature or pressure measuring instrument containing a temperature or pressure-responsive vibration sender may be lowered by means of a wire line down through the drill string while drilling without the use of cumbersome and expensive electrical cables. If desired, such instruments may be incorporated in the drill collar or bit. Batteries or a rubber propeller in the mud stream may be used to actuate said instrument.

The present invention is concerned with a device for transmitting sound wave signals through the mud fluid column or drill pipe, which signals may be used to indicate at the surface, for example, both the resistivity of the formation penetrated and the inclination of the borehole.

To accomplish this, a pressure wave transmitter, together with resistivity and inclination measuring instruments and batteries or a small mud stream generator yielding, for example, 100 watts, are all placed in an insulated section or stand of drill collars. Since the drill pipe conveys energy in flowing mud and is capable of carrying signals in vibrations of the mud, it is necessary to insulate electrically only enough of the drill pipe to isolate the formation being measured, whereby there is eliminated the use of insulated drill pipe, which is expensive to make and handle.

Briefly, the device simultaneously measures the electrical resistance of the formation and the inclination of the bit and drill collar and reports these measurements to the surfaces by a series of sound pulses sent through the drill pipe by the use of a sound transmitter controlled by an electrical analogue of the mechanical weight reporting device described hereinabove.

Referring to Figs. 1 to 6 of the drawings, one embodiment of a device suitable for this purpose comprises a bit 150 serving as the electrode which is attached to the lower end of the drill collar 151 by means of a connector or substitute 152 of insulating material such as Bakelite or the like and a usual substitute 153. The bore 154 in the drill collar is enlarged in its upper portion as at 155 and this enlarged portion 155 contains a transmitter, such as a horn 156 of about 100 cycles, in uppermost position, a mud turbine 157 preferably with rubber impellers 158, connected to a suitable electrical current generator 159 by means of gears 160, and therebelow in a fluid tight housing 164 a pendulum 165 hung by a ball and socket suspension 166. The pendulum 165 is caused to hang vertically downward in spite of the vibration and rotation of the drill collar 151 by applying thereto suitable damping forces, such as by means of a contained free gyroscope 167 in oil. The pendulum 165 forms or carries the movable element 168 of a variable condenser 169, which forms a part of the indicating circuit. The remainder of the indicating circuit may be suitably arranged for the sake of balance of the drill collar 151 in a pair of tubular housings 171 positioned in recesses 172 in the inner walls of the drill collar 151, as shown most clearly in Fig. 2.

Briefly the indicating circuit may comprise a multivibrator circuit so arranged that an included pair of triode radio tubes are each separately timed by the quantities being measured, namely, the resistivity of the formation and the inclination of the borehole, respectively, and alternately fire and suppress one another. While one of the two tubes is passing plate current, which may be, for example, for a length of time proportional to the resistivity of the formation, the transmitter or horn 156 is actuated and sends a blast of sound or pressure waves up the drill pipe. While the other of the tubes is passing plate current, which in this case is for a length of time in proportion to the inclination of the drill collar, the horn 156 is silent. These alternate periods of sound and silence may be translated by a suitable instrument at the surface into continuous curves drawn against depth.

Referring to the diagram of Fig. 4, a preferred form of the indicating circuit comprises a high frequency generator 181 from which a high frequency current flows to the ground at 182 through condensers 183 and 169, the latter being the variable condenser 169 operated by the pendulum 165. The voltage developed across the variable condenser 169 is approximately inversely proportional to the capacity of condenser 169, which capacity decreases with increasing inclination of the instrument. The A. C. voltage across condenser 169 is rectified by diode tube 185 and filtered by resistors 186 and 187 and condensers 188 and 190a so that the voltage $a$ across condenser 190a is D. C. and positive, and increases with an increase in the angle of inclination of the instrument. In a somewhat similar manner, a positive D. C. voltage $b$ is obtained across condenser 190b which increases with an increase in the resistivity of the formation by drawing its controlling voltage from a suitable circuit comprising a filter and a detector furnishing a voltage indicating the resistivity, such as for example, shown in Karcher 1,927,664 or Leonardon 2,249,769. A multivibrator comprises the central portion of the circuit as indicated in Fig. 4, and includes a pair of gas triode tubes 192a and 192b and resistances 193a and 193b. $a$ and $b$ are the grid bias voltages for the multivibrator and control its two periods in the following manner.

At a certain time, tube 192a is carrying plate current and tube 192b is blocked by a highly negative grid voltage which may be designated as $Gb$. This voltage, $Gb$, gradually decreases in magnitude due to the current from condneser 190b through resistor 193b. After the grid voltage $Gb$ passes the cutoff valve, tube 192b fires, rapidly lowering the grid voltage $Ga$ of tube 192a. Suddenly tube 192b starts carrying the maximum current and its plate voltage drops to zero, while tube 192a blocks, its plate potential jumping up to the plate supply voltage.

The grid voltage $Gb$ for tube 192b remains sufficiently positive so that the plate current of tube 192b is limited almost entirely by the plate resistor 194b and is but little affected by changes in the grid voltage $Gb$, until after the grid voltage $Ga$ for the tube 192a has passed cutoff. Then the rapid drop in plate voltage of tube 192a quickly pulls the grid voltage $Gb$ of the tube 192b down to the point at which effective control begins and the sudden jump occurs. Hence the length of the integral (jump to jump) during which the grid voltage $Ga$ to tube 192a is negative is primarily determined by the time required for current from condenser 190a through resistor 193a to raise grid voltage $Ga$ to cutoff. This depends on the coupling condenser capacity, the resistance of resistor 193a and the cutoff grid voltage, all of which are constant, and upon the grid bias voltage $a$ and the peak negative value of grid voltage Ga just after the jump. The latter in turn is determined by the size of the jump in plate voltage of tube 192b which is substantially constant, and by the value of grid voltage Ga just before the jump which increases with the grid bias voltage a. Increasing grid bias voltage a therefore increases the magnitude of the negative peak of the grid voltage Ga and also increases the rate of rise after the peak. Both of these changes reduce the time required for grid voltage Ga to rise to cutoff, and hence increasing grid bias voltage a reduces the length of the interval from jump to jump for tube 192a. Likewise, increasing the grid bias voltage b reduces the length of the interval for tube 192b, during which grid voltage Ga for tube 192a is positive. The two intervals for the tubes 192a and 192b may therefore be used to indicate the inclination and resistivity, respectively.

The horn 156, or other suitable generator of pressure waves in the drilling fluid, is controlled by a relay 195 connected to the plate circuit of tube 192a so that the horn 156 alternately is operated for the interval from jump to jump for tube 192a and is off for the interval for tube 192b.

At the surface is a sufficiently sensitive recording receiver 196 (Fig. 5) of pressure waves, such as sound waves, tuned to the frequency of the horn 156. The receiver 196 may be connected to the mud hose swivel 197, as shown in Fig. 5, to receive waves traveling up through the drilling fluid in the drill pipe. However, if desired, the receiver 196 may be placed to pick up waves in the rock or ground at a quiet location some distance away from the drilling rig, when, for example, there are used sound or pressure waves of a frequency that does not stay confined in the pipe.

Figure 6:
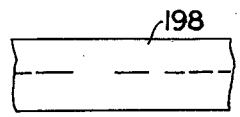
Fig. 6 is an illustrative portion of the record chart obtained at the surface.

As shown in Fig. 6, the record chart 198 produced by the recording receiver 196 indicates by means of the length of the dashes and the length of the spaces between the dashes the values of the inclination of the borehole and the resistivity of the formation, respectively.

As will be apparent, various other modifications of this device may be readily made without departing from the spirit of the invention. Thus, although the preferred embodiment of this instrument described above shows a simplified form of resistivity measurement wherein only current electrodes are used, other arrangements can be used.

I claim as my invention:

1. In a system for continuously obtaining at the surface of a well indications of two independent well borehole variables, the combination of a drill string adapted to be lowered into the borehole, separate measuring means in the lower portion of said drill string for each of said variables, and means contained in the lower portion of the borehole for sending indications of said borehole variables to the surface, said means comprising a power source, a sound transmitter, an electrical circuit for timing the periods of actuation and silence of said transmitter in response alternately to the magnitude of said measurement of one of said variables and to the magnitude of said measurement of the other of said variables, and means at the well surface for receiving and recording the sound signals from said transmitter.

2. In a system for continuously obtaining at the surface of a well indications of the inclination of the well and of the resistivity of the formation adjacent the drill bit, the combination of drill string adapted to be lowered into the borehole, a drill bit insulatedly attached to the lower end of said drill string, formation-resistivity measuring means in the lower portion of said drill string and electrically connected to said drill bit, inclination-responsive means in the lower portion of said drill string, and means contained in the lower portion of the borehole for sending indications of the resistivity measurement and the borehole inclination, said means comprising a power source, a sound transmitter, and an electrical circuit for timing the periods of actuation and silence of said transmitter in response alternately to the magnitude of said resistivity measurement and said borehole inclination, and means at the well surface for receiving and recording the sound signals from said transmitter.

GERALD L. HASSLER.

Certificate of Correction

Patent No. 2,380,520. July 31, 1945.

GERALD L. HASSLER

It is hereby certified that errors appear in the printed specification of the above numbered patent requiring correction as follows: Page 2, second column, line 50, for "valve" read *value*; line 66, for "integral" read *interval*; and that the said Letters Patent should be read with these corrections therein that the same may conform to the record of the case in the Patent Office.

Signed and sealed this 8th day of October, A. D. 1946.

[SEAL]

LESLIE FRAZER,
*First Assistant Commissioner of Patents.*